(12) United States Patent
Qin et al.

(10) Patent No.: US 8,372,925 B2
(45) Date of Patent: Feb. 12, 2013

(54) NICKEL-BASED CATALYST COMPOSITION

(75) Inventors: Zengquan Qin, Copley, OH (US); Jason T. Poulton, Akron, OH (US); David M. Roggeman, North Royalton, OH (US); Shigeaki Matsuo, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 260 days.

(21) Appl. No.: 12/098,825

(22) Filed: Apr. 7, 2008

(65) Prior Publication Data

US 2008/0255327 A1 Oct. 16, 2008

Related U.S. Application Data

(60) Provisional application No. 60/922,666, filed on Apr. 10, 2007.

(51) Int. Cl.
*C08F 4/14* (2006.01)
*C08F 4/52* (2006.01)

(52) U.S. Cl. ............... 526/136; 526/133; 526/340.4; 402/111; 402/117

(58) Field of Classification Search .............. 526/136, 526/133, 340.4; 502/111, 117
See application file for complete search history.

(56) References Cited

U.S. PATENT DOCUMENTS

| | | | |
|---|---|---|---|
| 3,170,907 A | 2/1965 | Ueda et al. | |
| 3,464,965 A | 9/1969 | Yasunaga et al. | |
| 3,483,177 A | 12/1969 | Throckmorton et al. | |
| 3,528,957 A | 9/1970 | Throckmorton et al. | |
| 3,816,567 A | 6/1974 | Yagi et al. | |
| 3,843,618 A * | 10/1974 | Yagi et al. | 526/138 |
| 4,102,817 A * | 7/1978 | Throckmorton et al. | 502/117 |
| 4,155,880 A | 5/1979 | Throckmorton et al. | |
| 4,383,097 A | 5/1983 | Castner et al. | |
| 4,501,866 A * | 2/1985 | Roggeman et al. | 526/133 |
| 4,522,988 A | 6/1985 | Kang et al. | |
| 5,100,982 A | 3/1992 | Castner | |
| 5,227,425 A | 7/1993 | Rauline | |
| 5,412,045 A | 5/1995 | Osman et al. | |
| 5,451,646 A | 9/1995 | Castner | |
| 5,596,053 A * | 1/1997 | Kang et al. | 526/132 |
| 5,686,543 A | 11/1997 | Yasuda et al. | |
| 5,698,643 A | 12/1997 | Donbar et al. | |
| 5,717,022 A | 2/1998 | Beckmann et al. | |
| 5,719,207 A | 2/1998 | Cohen et al. | |
| 6,013,746 A | 1/2000 | Jang et al. | |
| 6,586,542 B2 | 7/2003 | Jang et al. | |

FOREIGN PATENT DOCUMENTS

| | | |
|---|---|---|
| DE | 214751 C | 10/1909 |
| EP | 0 890 606 A1 | 1/1999 |
| WO | 9907745 A1 | 2/1999 |
| WO | WO97/07745 | 2/1999 |

OTHER PUBLICATIONS

Ovchinnikova, G.M., English translation of Feb. 3, 2012 Office Action from corresponding Russian Patent Application No. 2008113931 (2 pp.).

* cited by examiner

*Primary Examiner* — Ling Choi
*Assistant Examiner* — Brieann R Fink
(74) *Attorney, Agent, or Firm* — Meredith E. Hooker; Arthur M. Reginelli

(57) ABSTRACT

In general the present invention provides a process for forming conjugated diene polymer, the process comprising the step of polymerizing conjugated diene monomer in the presence of a catalytically effective amount of a catalyst composition formed by combining (a) a nickel-containing compound, (b) an alkylating agent, (c) a fluorine-containing compound, (d) a carboxylic acid, and (e) an alcohol.

18 Claims, No Drawings

NICKEL-BASED CATALYST COMPOSITION

This application claims the benefit of U.S. Provisional Patent Application Ser. No. 60/922,666, filed on Apr. 10, 2007, which is incorporated herein by reference.

FIELD OF THE INVENTION

One or more embodiments of the present invention are directed toward nickel-based catalyst compositions and methods for producing nickel-catalyzed polydienes.

BACKGROUND OF THE INVENTION

Nickel-based catalyst systems including a nickel-containing compound, an organoaluminum compound, and a fluorine-containing compound may be employed for polymerizing 1,3-butadiene to form cis-1,4-polybutadiene. The fluorine-containing compounds may include boron trifluoride and complexes of boron trifluoride with monohydric alcohols, phenols, water, mineral acids, ketones, esters, ethers, and nitrites. It has been suggested in the prior art that blends of alkyl aluminum compounds, such as those containing $C_2$ and $C_8$-$C_{12}$ alkyl groups can be employed to produce high cis-1,4-polybutadiene with reduced microgel. It has also been suggested that polymers with reduced cold flow can be achieved by adding the catalyst system in the presence of a small amount of monomer.

Because it may be desirable to produce cis-1,4-polybutadiene with lower molecular weight, efforts have been made to control the molecular weight of the resultant polymers produced with nickel-based catalysts. For example, the polymerizations may be conducted in the presence of non-conjugated diolefins or olefins such as 1-butene, isobutylene, cis and trans-2-butene, and allene. In other instances, molecular weight reduction has been achieved by conducting the polymerization in the presence of halogenated phenols or para-styrenated diphenylamine.

Also, the molecular weight distribution of nickel-synthesized polybutadienes has been controlled by conducting the polymerization in the presence of halogenated aldehydes and/or quinone compounds. In other instances, molecular weight distribution has been controlled by conducting the polymerization in the presence of carboxylic acids.

Still further, the degree of branching of the nickel-synthesized cis-1,4-polybutadienes has been controlled by conducting the polymerization in the presence of dialkyl zinc compounds.

While several advancements have been made in the production of cis-1,4-polybutadiene produced with nickel-based catalyst systems, the fact that these nickel-based systems are advantageously employed in many commercial applications, there remains a need to continue improvements. For example, there remains a desire to control gelation, control branching, control molecular weight, and improve yield and reaction times.

SUMMARY OF THE INVENTION

One or more embodiments of the present invention provide a process for forming conjugated diene polymer, the process comprising the step of polymerizing conjugated diene monomer in the presence of a catalytically effective amount of a catalyst composition formed by combining (a) a nickel-containing compound, (b) an alkylating agent, (c) a fluorine-containing compound, and (d) a carboxylic acid, and (e) an alcohol.

Other embodiments provide a catalyst composition that is the combination of or the reaction product of ingredients comprising (a) a nickel-containing compound, (b) an alkylating agent, (c) a fluorine-containing compound, (d) a carboxylic acid, and (e) an alcohol.

DETAILED DESCRIPTION OF ILLUSTRATIVE EMBODIMENTS

The catalyst composition of one or more embodiments of the present invention includes the combination of or reaction product of ingredients including (a) a nickel-containing compound, (b) an alkylating agent, (c) fluorine-containing compound, (d) a carboxylic acid, and (e) an alcohol. In certain embodiments, these catalyst compositions are devoid or substantially devoid of other constituents such as Lewis bases or Lewis acids.

Various nickel-containing compounds or mixtures thereof can be employed. In one or more embodiments, these nickel-containing compounds may be soluble in hydrocarbon solvents such as aromatic hydrocarbons, aliphatic hydrocarbons, or cycloaliphatic hydrocarbons. In other embodiments, hydrocarbon-insoluble nickel-containing compounds, which can be suspended in the polymerization medium to form catalytically active species, may also be useful.

The nickel atom in the nickel-containing compounds can be in various oxidation states including but not limited to the 0, +2, +3, and +4 oxidation states. Nickel-containing compounds include, but are not limited to, nickel carboxylates, nickel carboxylate borates, nickel organophosphates, nickel organophosphonates, nickel organophosphinates, nickel carbamates, nickel dithiocarbamates, nickel xanthates, nickel β-diketonates, nickel alkoxides or aryloxides, nickel halides, nickel pseudo-halides, nickel oxyhalides, and organonickel compounds.

Nickel carboxylates can include nickel formate, nickel acetate, nickel acrylate, nickel methacrylate, nickel valerate, nickel gluconate, nickel citrate, nickel fumarate, nickel lactate, nickel maleate, nickel oxalate, nickel 2-ethylhexanoate, nickel neodecanoate, nickel naphthenate, nickel stearate, nickel oleate, nickel benzoate, and nickel picolinate.

Nickel carboxylate borates may include compounds defined by the formulae $(RCOONiO)_3B$ or $(RCOONiO)_2B(OR)$, where each R, which may be the same or different, is a hydrogen atom or a mono-valent organic group. In one embodiment, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Nickel carboxylate borate may include those disclosed in U.S. Pat. No. 4,522,988, which is incorporated herein by reference. Specific examples of nickel carboxylate borate include nickel (II) neodecanoate borate, nickel (II) hexanoate borate, nickel (II) naphthenate borate, nickel (II) stearate borate, nickel (II) octoate borate, nickel (II) 2-ethylhexanoate borate, and mixtures thereof.

Nickel organophosphates can include nickel dibutyl phosphate, nickel dipentyl phosphate, nickel dihexyl phosphate, nickel diheptyl phosphate, nickel dioctyl phosphate, nickel bis(1-methylheptyl) phosphate, nickel bis(2-ethylhexyl) phosphate, nickel didecyl phosphate, nickel didodecyl phosphate, nickel dioctadecyl phosphate, nickel dioleyl phosphate, nickel diphenyl phosphate, nickel bis(p-nonylphenyl) phosphate, nickel butyl (2-ethylhexyl) phosphate, nickel (1-methylheptyl) (2-ethylhexyl) phosphate, and nickel (2-ethylhexyl) (p-nonylphenyl) phosphate.

Nickel organophosphonates can include nickel butyl phosphonate, nickel pentyl phosphonate, nickel hexyl phosphonate, nickel heptyl phosphonate, nickel octyl phosphonate, nickel (1-methylheptyl) phosphonate, nickel (2-ethylhexyl) phosphonate, nickel decyl phosphonate, nickel dodecyl phosphonate, nickel octadecyl phosphonate, nickel oleyl phosphonate, nickel phenyl phosphonate, nickel (p-nonylphenyl) phosphonate, nickel butyl butylphosphonate, nickel pentyl pentylphosphonate, nickel hexyl hexylphosphonate, nickel heptyl heptylphosphonate, nickel octyl octylphosphonate, nickel (1-methylheptyl) (1-methylheptyl)phosphonate, nickel (2-ethylhexyl) (2-ethylhexyl)phosphonate, nickel decyl decylphosphonate, nickel dodecyl dodecylphosphonate, nickel octadecyl octadecylphosphonate, nickel oleyl oleylphosphonate, nickel phenyl phenylphosphonate, nickel (p-nonylphenyl) (p-nonylphenyl)phosphonate, nickel butyl (2-ethylhexyl)phosphonate, nickel (2-ethylhexyl)butylphosphonate, nickel (1-methylheptyl) (2-ethylhexyl)phosphonate, nickel (2-ethylhexyl)(1-methylheptyl)phosphonate, nickel (2-ethylhexyl)(p-nonylphenyl)phosphonate, and nickel (p-nonylphenyl)(2-ethylhexyl)phosphonate.

Nickel organophosphinates can include nickel butylphosphinate, nickel pentylphosphinate, nickel hexylphosphinate, nickel heptylphosphinate, nickel octylphosphinate, nickel (1-methylheptyl)phosphinate, nickel (2-ethylhexyl)phosphinate, nickel decylphosphinate, nickel dodecylphosphinate, nickel octadecylphosphinate, nickel oleylphosphinate, nickel phenylphosphinate, nickel (p-nonylphenyl)phosphinate, nickel dibutylphosphinate, nickel dipentylphosphinate, nickel dihexylphosphinate, nickel diheptylphosphinate, nickel dioctylphosphinate, nickel bis(1-methylheptyl)phosphinate, nickel bis(2-ethylhexyl)phosphinate, nickel didecylphosphinate, nickel didodecylphosphinate, nickel dioctadecylphosphinate, nickel dioleylphosphinate, nickel diphenylphosphinate, nickel bis(p-nonylphenyl)phosphinate, nickel butyl(2-ethylhexyl)phosphinate, nickel (1-methylheptyl)(2-ethylhexyl)phosphinate, and nickel (2-ethylhexyl)(p-nonylphenyl)phosphinate.

Nickel carbamates can include nickel dimethylcarbamate, nickel diethylcarbamate, nickel diisopropylcarbamate, nickel dibutylcarbamate, and nickel dibenzylcarbamate.

Nickel dithiocarbamates can include nickel dimethyldithiocarbamate, nickel diethyldithiocarbamate, nickel diisopropyldithiocarbamate, nickel dibutyldithiocarbamate, and nickel dibenzyldithiocarbamate.

Nickel xanthates include nickel methylxanthate, nickel ethylxanthate, nickel isopropylxanthate, nickel butylxanthate, and nickel benzylxanthate.

Nickel β-diketonates can include nickel acetylacetonate, nickel trifluoroacetylacetonate, nickel hexafluoroacetylacetonate, nickel benzoylacetonate, and nickel 2,2,6,6-tetramethyl-3,5-heptanedionate.

Nickel alkoxides or aryloxides can include nickel methoxide, nickel ethoxide, nickel isopropoxide, nickel 2-ethylhexoxide, nickel phenoxide, nickel nonylphenoxide, and nickel naphthoxide.

Nickel halides can include nickel fluoride, nickel chloride, nickel bromide, and nickel iodide. Nickel pseudo-halides include nickel cyanide, nickel cyanate, nickel thiocyanate, nickel azide, and nickel ferrocyanide. Nickel oxyhalides include nickel oxyfluoride, nickel oxychloride and nickel oxybromide. Where the nickel halides, nickel oxyhalides or other nickel-containing compounds contain labile fluorine or chlorine atoms, the nickel-containing compounds can also serve as the fluorine-containing compound or the chlorine-containing compound. A Lewis base such as an alcohol can be used as a solubility aid for this class of compounds.

The term organonickel compound may refer to any nickel compound containing at least one nickel-carbon bond. Organonickel compounds include bis(cyclopentadienyl)nickel (also called nickelocene), bis(pentamethylcyclopentadienyl)nickel (also called decamethylnickelocene), bis(tetramethylcyclopentadienyl)nickel, bis(ethylcyclopentadienyl)nickel, bis(isopropylcyclopentadienyl)nickel, bis(pentadienyl)nickel, bis(2,4-dimethylpentadienyl)nickel, (cyclopentadienyl)(pentadienyl)nickel, bis(1,5-cyclooctadiene)nickel, bis(allyl)nickel, bis(methallyl)nickel, and bis(crotyl)nickel.

Various alkylating agents, or mixtures thereof, can be used. Alkylating agents, which may also be referred to as hydrocarbylating agents, include organometallic compounds that can transfer hydrocarbyl groups to another metal. Typically, these agents include organometallic compounds of electropositive metals such as Groups 1, 2, and 3 metals (Groups IA, IIA, and IIIA metals). In one or more embodiments, alkylating agents include organoaluminum and organomagnesium compounds. Where the alkylating agent includes labile fluorine the alkylating agent may also serve as the fluorine-containing compound. In certain embodiments, the alkylating agents include those that are devoid of chlorine or bromine atoms.

The term "organoaluminum compound" may refer to any aluminum compound containing at least one aluminum-carbon bond. In one or more embodiments, organoaluminum compounds may be soluble in a hydrocarbon solvent.

In one or more embodiments, organoaluminum compounds include those represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. In one or more embodiments, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, where each group may contain from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms.

Organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Hydrocarbylaluminum dichloride include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds include aluminoxanes. Aluminoxanes include oligomeric linear aluminoxanes that can be represented by the general formula:

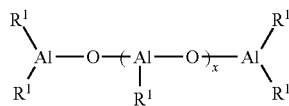

and oligomeric cyclic aluminoxanes that can be represented by the general formula:

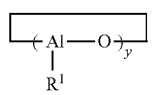

where x may be an integer of 1 to about 100, and in other embodiments about 10 to about 50; y may be an integer of 2 to about 100, and in other embodiments about 3 to about 20; and where each $R^1$, which may be the same or different, may be a mono-valent organic group that is attached to the aluminum atom via a carbon atom. In one or more embodiments, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, where each group may contain from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound may be dissolved in an organic solvent and then contacted with water, (2) a method in which the trihydrocarbylaluminum compound may be reacted with water of crystallization contained in, for example, metal salts, or water adsorbed in inorganic or organic compounds, and (3) a method in which the trihydrocarbylaluminum compound may be reacted with water in the presence of the monomer or monomer solution that is to be polymerized.

Aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Isobutylaluminoxane is particularly useful on the grounds of its availability and its solubility in aliphatic and cycloaliphatic hydrocarbon solvents. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methyl aluminoxane and diisobutyl aluminum hydride are employed in combination.

The term organomagnesium compound may refer to any magnesium compound that contains at least one magnesium-carbon bond. Organomagnesium compounds may be soluble in a hydrocarbon solvent. One class of organomagnesium compounds that can be utilized may be represented by the formula $MgR^2_2$, where each $R^2$, which may be the same or different, is a mono-valent organic group, with the proviso that the group is attached to the magnesium atom via a carbon atom. In one or more embodiments, each $R^2$ may be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, where each group may contain from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atom.

Examples of suitable dihydrocarbylmagnesium compounds that can be utilized include diethylmagnesium, di-n-propylmagnesium, diisopropylmagnesium, dibutylmagnesium, dihexylmagnesium, diphenylmagnesium, dibenzylmagnesium, and mixtures thereof. Dibutylmagnesium may be readily available and may be soluble in aliphatic and cycloaliphatic hydrocarbon solvents.

Organomagnesium compounds that can be represented by the formula $R^3MgX$ include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Fluorine-containing compounds may include various compounds, or mixtures thereof, that contain one or more labile fluorine atoms. In one or more embodiments, the fluorine-containing compound may be soluble in a hydrocarbon solvent. In other embodiments, hydrocarbon-insoluble fluorine-containing compounds, which can be suspended in the polymerization medium to form the catalytically active species, may be useful.

Types of fluorine-containing compounds include, but are not limited to, elemental fluorine, halogen fluorides, hydrogen fluoride, organic fluorides, inorganic fluorides, metallic fluorides, organometallic fluorides, and mixtures thereof. In one or more embodiments, the complexes of the fluorine-containing compounds with a Lewis base such as ethers, alcohols, water, aldehydes, ketones, esters, nitrites, or mixtures thereof may be employed. Specific examples of these complexes include the complexes of boron trifluoride and hydrogen fluoride with a Lewis base.

Halogen fluorides may include iodine monofluoride, iodine trifluoride, and iodine pentafluoride.

Organic fluorides may include t-butyl fluoride, allyl fluoride, benzyl fluoride, fluoro-di-phenylmethane, triphenylmethyl fluoride, benzylidene fluoride, methyltrifluorosilane, phenyltrifluorosilane, dimethyldifluorosilane, diphenyldifluorosilane, trimethylfluorosilane, benzoyl fluoride, propionyl fluoride, and methyl fluoroformate.

Inorganic fluorides may include phosphorus trifluoride, phosphorus pentafluoride, phosphorus oxyfluoride, boron trifluoride, silicon tetrafluoride, arsenic trifluoride, selenium tetrafluoride, and tellurium tetrafluoride.

Metallic fluorides may include tin tetrafluoride, aluminum trifluoride, antimony trifluoride, antimony pentafluoride, gallium trifluoride, indium trifluoride, titanium tetrafluoride, and zinc difluoride.

Organometallic fluorides may include dimethylaluminum fluoride, diethylaluminum fluoride, methylaluminum difluoride, ethylaluminum difluoride, methylaluminum sesquifluoride, ethylaluminum sesquifluoride, isobutylaluminum sesquifluoride, methylmagnesium fluoride, ethylmagnesium fluoride, butylmagnesium fluoride, phenylmagnesium fluoride, benzylmagnesium fluoride, trimethyltin fluoride, triethyltin fluoride, di-t-butyltin difluoride, dibutyltin difluoride, and tributyltin fluoride.

Various carboxylic acids and mixtures may be employed. Primary and secondary carboxylic acids include those carboxylic acids wherein the α-carbon (i.e., the carbon adjacent to the carbon including the acid group) is primary or secondary.

The carboxylic acids may include aliphatic carboxylic acids, which include straight chain or branched carboxylic acids. In other embodiments, the carboxylic acids may include cyclic carboxylic acids, or in other embodiments aromatic carboxylic acids, or in other embodiments polycyclic acids. In these or other embodiments, the carboxylic acids may be saturated, and in other embodiments they may unsaturated. In certain embodiments, useful carboxylic acids include those carboxylic acids that are soluble, or at least partially soluble, within the reaction medium in which the polymerization takes place.

In one or more embodiments, useful carboxylic acids may be defined by the formula R—COOH, where R is a monovalent organic group, and COOH is a carboxyl group. Monovalent organic groups may include hydrocarbyl groups or substituted hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups. Substituted groups include those groups where a hydrogen atom of the group is itself replaced by a monovalent organic group. These hydrocarbyl groups may contain heteroatoms such as, but not limited to, nitrogen, oxygen, silicon, tin, sulfur, boron, and phosphorous atoms. In certain embodiments, the hydrocarbyl group is devoid of halogen atom such as chlorine or bromine atoms. In certain embodiments, the monovalent organic group may contain one or more carboxyl groups attached thereto. As a result, the carboxylic acid may contain two or more carboxyl groups. In other embodiments, the hydrocarbyl groups are devoid of heteroatoms.

In one or more embodiments, useful carboxylic acids include from 1 to about 30 carbon atoms, in other embodiments from about 2 to about 26 carbon atoms, in other embodiments from about 4 to about 18 carbon atoms, and in other embodiments from about 6 to about 12 carbon atoms.

Exemplary aliphatic carboxylic acids include formic acid, ethanoic acid, propanoic acid, isopropanoic acid, butanoic acid, t-butanoic acid, isobutanoic acid, n-pentanoic acid, n-hexanoic acid, 2-ethyl hexanoic acid, n-heptanoic acid, octanoic acid, decanoic acid, hexadecanoic acid, and mixtures thereof.

Other exemplary carboxylic acids, which may be referred to as saturated fatty acids, include, butyric acid, lauric acid, plamitic acid, stearic acid, and mixtures thereof.

Exemplary unsaturated carboxylic acids, which may be referred to as unsaturated fatty acids, include oleic acid, linoleic acid, linolenic acid, and mixtures thereof.

Exemplary aromatic acids include benzoic acid, salicylic acid, and mixtures thereof.

Exemplary cyclic acids include abietic acid, chaulmoogric acid, rosin acids such as albietic acid and pimaric acid, and mixtures thereof.

Various alcohols and mixtures may be employed. In one or more embodiments, the alcohols include monohydric alcohols (i.e. those including one hydroxyl group), and in other embodiments the alcohols include multihydric alcohols (i.e. those including two or more hydroxyl groups) including dihydric alcohols, which may be referred to as glycols or diols, trihydric alcohols, which may be referred to as glycerols, and polyhydic alcohols. In one or more embodiments, the alcohols include primary and/or secondary alcohols. Primary and secondary alcohols include those alcohols wherein the α-carbon (i.e., the carbon adjacent to the carbon including the hydroxyl group) is primary or secondary.

The alcohols may include aliphatic alcohols, which include straight chain or branched alcohols. In other embodiments, the alcohols may include cyclic alcohols, in other embodiments aromatic alcohols, in other embodiments heterocyclic alcohols, and in other embodiments polycyclic alcohols.

In these or other embodiments, the alcohols may be saturated, and in other embodiments they may unsaturated. In certain embodiments, useful alcohols include those alcohols that are soluble, or at least partially soluble, within the reaction medium in which the polymerization takes place.

In one or more embodiments, useful alcohols may be defined by the formula R—OH, where R is a monovalent organic group, and —OH is a hydroxyl group. Monovalent organic groups may include hydrocarbyl groups or substituted hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups. Substituted groups include those groups where a hydrogen atom of the group is itself replaced by a monovalent organic group. These hydrocarbyl groups may contain heteroatoms such as, but not limited to, nitrogen, oxygen, silicon, tin, sulfur, boron, and phosphorous atoms. In certain embodiments, the hydrocarbyl group may be devoid of halogen atoms such as a chlorine or bromine atom. In certain embodiments, the monovalent organic group may contain one or more hydroxyl groups attached thereto. As a result, the alcohol may contain two or more hydroxyl groups. In other embodiments, the hydrocarbyl groups are devoid of heteroatoms.

In one or more embodiments, useful alcohols include from 1 to about 40 carbon atoms, in other embodiments from about 2 to about 26 carbon atoms, in other embodiments from about 4 to about 18 carbon atoms, and in other embodiments from about 6 to about 12 carbon atoms.

Exemplary aliphatic alcohols include methanol, ethanol, propanol, isopropanol, n-butanol, t-butanol, isobutanol, n-pentanol, n-hexanol, 2-ethyl hexanol, n-heptanol, octanol, decanol, and mixtures thereof.

Exemplary cyclic alcohols include cyclohexanol, methanol, t-butyl cyclohexanol, cyclopentanol, cycloheptanol, cyclooctanol, and mixtures thereof.

Exemplary unsaturated alcohols include allyl alcohol, and mixtures thereof.

Exemplary aromatic alcohols include substituted phenol, phenol, benzyl alcohol, and mixtures thereof.

Exemplary heterocyclic alcohols include furfuryl alcohol, and mixtures thereof.

Exemplary polycyclic alcohols include sterols, and mixtures thereof.

The foregoing catalyst compositions may have high catalytic activity for polymerizing conjugated dienes into stereospecific polydienes over a wide range of catalyst concentrations and catalyst ingredient ratios. It is believed that the catalyst ingredients may interact to form an active catalyst species. It is also believed that the optimum concentration for any one catalyst ingredient may be dependent upon the concentration of the other catalyst ingredients.

In one or more embodiments, the molar ratio of the alkylating agent to the nickel-containing compound (alkylating agent/Ni) can be varied from about 1:1 to about 200:1, in other embodiments from about 3:1 to about 30:1, and in other embodiments from about 5:1 to about 15:1. The term molar ratio, as used herein, refers to the equivalent ratio of relevant components of the ingredients, e.g., the ratio of equivalents of aluminum atoms on the aluminum-containing compound to equivalents of nickel atoms on the nickel-containing compound. In other words, where difunctional or polyfunctional compounds (e.g., those compounds including two or more carboxylic acid groups) are employed, fewer moles of the compound is required to achieve the desired equivalent ratio.

In one or more embodiments, the molar ratio of the fluorine-containing compound to the nickel-containing compound (F/Ni) can be varied from about 7:1 to about 500:1, in other embodiments from about 7.5:1 to about 450:1, and in other embodiments from about 8:1 to about 400:1.

In one or more embodiments, the molar ratio of the carboxylic acid to the nickel-containing compound (—COOH/Ni) can be varied from about 0.1:1 to about 10:1, in other embodiments from about 0.5:1 to about 5:1, and in other embodiments from about 0.7:1 to about 2:1.

In one or more embodiments, the molar ratio of the alcohol to the nickel-containing compound (—OH/Ni) can be varied from about 0.4:1 to about 80:1, in other embodiments from about 0.5:1 to about 75:1, and in other embodiments from about 0.7:1 to about 65:1. The term molar ratio, as used herein, refers to the equivalent ratio of relevant components of the ingredients, e.g., the ratio of equivalents of chlorine atoms on the chlorine-containing compound to equivalents of nickel atoms on the nickel-containing compound.

The catalyst composition may be formed by combining or mixing the catalyst ingredients. Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition of this invention can be formed by using one of the following methods.

In one or more embodiments, the catalyst composition may be formed in situ by adding the catalyst ingredients to a solution containing monomer and solvent or simply bulk monomer, in either a stepwise or simultaneous manner. In one embodiment, a mixture of the alkylating agent, the nickel-containing compound, the carboxylic acid, and the alcohol is formed. This mixture may be formed within a solvent. This mixture and the fluorine-containing compound may then be added to the monomer to be polymerized.

In one or more embodiments, the selected catalyst ingredients may be pre-mixed outside the polymerization system at an appropriate temperature, which may be from about −20° C. to about 80° C., and the resulting catalyst composition may be aged for a period of time ranging from a few seconds to a few days and then added to the monomer.

In one or more embodiments, the mixture of the alkylating agent, nickel-containing compound, carboxylic acid, and alcohol is formed in the presence of a small amount of monomer and optionally a solvent. That is, the selected catalyst ingredients may be formed in the presence of a small amount of conjugated diene monomer at an appropriate temperature, which may be from about −20° C. to about 80° C. The amount of conjugated diene monomer that may be used to form this mixture can range from about 1 to about 500 moles per mole, in other embodiments from about 5 to about 250 moles per mole, and in other embodiments from about 10 to about 100 moles per mole of the nickel-containing compound. The resulting composition may be aged for a period of time ranging from a few seconds to a few days and then added to the remainder of the conjugated diene monomer that is to be polymerized together with the fluorine-containing compound.

When a solution of the catalyst composition or one or more of the catalyst ingredients is prepared outside the polymerization system as set forth in the foregoing methods, an organic solvent or carrier may be employed. The organic solvent may serve to dissolve the catalyst composition or ingredients, or the solvent may simply serve as a carrier in which the catalyst composition or ingredients may be suspended. The organic solvent may be inert to the catalyst composition. Useful solvents include hydrocarbon solvents such as aromatic hydrocarbons, aliphatic hydrocarbons, cycloaliphatic hydrocarbons and/or a mixture of two or more thereof. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used.

The catalyst composition of this invention exhibits very high catalytic activity for polymerizing conjugated dienes into cis-1,4-polydienes. Although specific embodiments may be directed toward the polymerization of 1,3-butadiene into cis-1,4-polybutadiene, other conjugated dienes can also be polymerized. Examples of other conjugated dienes that can be polymerized include isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

The production of polymer can be accomplished by polymerizing conjugated diene monomer in the presence of a catalytically effective amount of the foregoing catalyst composition. The total catalyst concentration to be employed in the polymerization mass may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used. In one or more embodiments, the amount of the nickel-containing compound used can be varied from about 0.001 to about 10 mmol, in other embodiments from about 0.002 to about 1 mmol, in other embodiments from about 0.005 to about 1.0 mmol, and in other embodiments from about 0.01 to about 0.1 mmol per 100 g of conjugated diene monomer.

The polymerization can be carried out in an organic solvent as the diluent. In one embodiment, a solution polymerization system can be employed, which is a system where the monomer to be polymerized and the polymer formed are soluble in the polymerization medium. In both cases, the monomer to be polymerized may be in a condensed phase. Also, the catalyst ingredients may be solubilized or suspended within the organic solvent. In these or other embodiments, the catalyst ingredients or components are unsupported or not impregnated onto a catalyst support. In other embodiments, the catalyst ingredients or components may be supported.

In one or more embodiments, the polymerization of conjugated dienes is advantageously carried out within a non-polar organic solvent. In one or more embodiments, non-polar organic solvents include hydrocarbon solvents such as aromatic hydrocarbons, aliphatic hydrocarbons, cycloaliphatic hydrocarbons and/or a mixture of two or more thereof. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used.

In performing these polymerizations, an amount of organic solvent in addition to the amount of organic solvent that may be used in preparing the catalyst composition may be added to the polymerization system. The additional organic solvent may be the same as or different from the organic solvent used in preparing the catalyst composition. An organic solvent that is inert with respect to the catalyst composition employed to catalyze the polymerization may be selected. Exemplary hydrocarbon solvents have been set forth above. When a solvent is employed, the concentration of the monomer to be polymerized may not be limited to a special range. In one or more embodiments, however, the concentration of the monomer present in the polymerization medium at the beginning of the polymerization can be in a range of from about 3% to about 80% by weight, in other embodiments from about 5% to about 50% by weight, in other embodiments from about 10% to about 30% by weight, and in other embodiments from about 15% to about 25% by weight.

The polymerization of conjugated dienes may also be carried out by means of bulk polymerization, which refers to a polymerization environment where substantially no solvents are employed. The bulk polymerization can be conducted either in a condensed liquid phase or in a gas phase.

The polymerization of conjugated dienes may be carried out as a batch process, a continuous process, or a semi-continuous process. In the semi-continuous process, monomer may be intermittently charged as needed to replace that monomer already polymerized. In any case, the polymerization may be conducted under anaerobic conditions by using an inert protective gas such as nitrogen, argon or helium, with moderate to vigorous agitation. The polymerization temperature may vary widely from a low temperature, such as $-10°$ C. or below, to a high temperature such as $120°$ C. or above, and in one embodiment in a temperature range being from about $50°$ C. to about $100°$ C. The heat of polymerization may be removed by external cooling (e.g., with a thermally controlled reactor jacket), internal cooling (e.g., by evaporation and condensation of the monomer or the solvent through the use of a reflux condenser connected to the reactor), or a combination of the methods. Although the polymerization pressure employed may vary widely, a pressure range of from about 1 atmosphere to about 10 atmospheres may be maintained.

Once a desired conversion is achieved, the polymerization can be stopped by adding a polymerization terminator that inactivates the catalyst. The terminator may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the terminator. The amount of the antioxidant employed may be in the range of 0.2% to 1% by weight of the polymer product.

When the polymerization mixture has been quenched, the polymer product can be recovered from the polymerization mixture by using any conventional procedures of desolventization and drying that are known in the art. For instance, the polymer can be recovered by subjecting the polymer cement to steam desolventization, followed by drying the resulting polymer crumbs in a hot air tunnel. Alternatively, the polymer may be recovered by directly drum-drying the polymer cement. The content of the volatile substances in the dried polymer can be below 1%, and in other embodiments below 0.5% by weight of the polymer.

The polydiene polymers of this invention are particularly useful in preparing tire components. These tire components can be prepared by using the polymers of this invention alone or together with other rubbery polymers. Other rubbery polymers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery polymers may derive from the polymerization of ethylene together with one or more α-olefins and optionally one or more diene monomers.

Useful rubbery polymers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in Kirk-Othmer, ENCYCLOPEDIA OF CHEMICAL TECHNOLOGY, Vol. 30, pgs. 365-468, (3$^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, (2$^{nd}$ Ed. 1989), which are incorporated herein by reference. Vulcanizing agents may be used alone or in combination. In one or more embodiments, the preparation of vulcanizable compositions and the construction and curing of the tire is not affected by the practice of this invention.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions are useful for forming tire components such as treads, subtreads, black sidewalls, body ply skins, bead filler, and the like. Preferably, the polydiene polymers are employed in tread formulations. In one or more embodiments, these tread formulations may include from about 10 to about 100% by weight, in other embodiments from about 35 to about 90% by weight, and in other embodiments from about 50 to 80% by weight of the polydiene polymer based on the total weight of the rubber within the formulation.

In one or more embodiments, the vulcanizable rubber composition may be prepared by forming an initial masterbatch that includes the rubber component and filler (the rubber component optionally including the polydiene polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Rubber compounding techniques and the additives employed therein are generally known as disclosed in *The Compounding and Vulcanization of Rubber*, in *Rubber Technology* (2$^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functionalized polymer of this invention and silica in the substantial absence of coupling and shielding agents.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference. In particular embodiments, the cis-1,4-polybutadiene produced according to the present invention are useful in preparing tire treads and tire sidewalls.

In order to demonstrate the practice of the present invention, the following examples have been prepared and tested. The examples should not, however, be viewed as limiting the scope of the invention. The claims will serve to define the invention.

EXAMPLES

Example 1

To a dry 2-gallon reactor purged with nitrogen was added hexane and then 1,3-butadiene (Bd) blend in hexane, resulting in 8.0 lb (3628.7 g, 12.1 mol) of 18.0% Bd solution in hexane. The solution was maintained at 25° C. Then, 1.764 millimole (mmol) of triethylaluminum (TEA), 0.196 mmol of nickel octanoate (NiOct, 0.030 mM phgm), 0.098 mmol 2-ethylhexanoic acid (EHA), and 0.405 mmol of 4-tert-butylcyclohexanol were sequentially added to a nitrogen-purged bottle containing small amount of Bd solution in hexane, yielding an orange solution. (The molar ratio of the TEA to NiOct was 9:1, and the molar ratio of the alcohol to TEA was 1.5:1) The solution was immediately charged into the reactor, followed by 4.409 mmol of boron trifluoride dibutyl etherate ($BF_3.OBu_2$). (The molar ratio of the $BF_3.OBu_2$ to TEA was 2.5:1). Then the jacket temperature of the reactor was set at 70° C. Polymerization was allowed to take place for one hour, at the end of which time the reaction mixture was treated with isopropanol containing 2,6-di-tert-butyl-4-methylphenol (BHT) in order to deactivate the catalyst and coagulate the polybutadiene. The polybutadiene was then dried in a drum-dryer at 120° C. The polymer was analyzed and the results are listed in Table 1.

Examples 2 to 4

Examples 2 to 4

The same procedures were conducted as described in Example 1, except that the amount of EHA was changed as listed in Table 1.

Comparative Examples A&B

Comparative Example A

The same procedures were conducted as described in Example 1, except that no 4-tert-butylcyclohexanol was used, and the amount of EHA was changed as listed in Table 1. There was polymer build-up in the reactor after polymerization, which is indicative of gellation.

Comparative Example B

The same procedures were conducted as described in Example 1, except that no EHA was used, and the amount of 4-tert-butylcyclohexanol was changed as listed in Table 1.

TABLE I

|  | Example No. | | | | | |
| --- | --- | --- | --- | --- | --- | --- |
|  | 1 | 2 | 3 | 4 | A (comparative) | B (comparative) |
| NiOct (mmol/hgm) | 0.030 | 0.030 | 0.030 | 0.030 | 0.030 | 0.030 |
| Al/Ni Molar ratio | 9.0 | 9.0 | 9.0 | 9.0 | 9.0 | 9.0 |
| Acid/Ni Molar ratio | 0.5 | 1.0 | 1.5 | 2.0 | 1.5 | 0 |
| Alcohol/Ni Molar ratio | 13.5 | 13.5 | 13.5 | 13.5 | 0 | 13.5 |
| F/Ni Molar ratio | 67.5 | 67.5 | 67.5 | 67.5 | 67.5 | 67.5 |
| Polymer yield (%) | 92 | 92 | 95 | 89 | 93 | 87 |
| Polymer properties |  |  |  |  |  |  |
| Mooney viscosity ($ML_{1+4}$)@ 100° C. | 60.5 | 62.2 | 51.1 | 50.0 | 65.0 | 43.8 |
| SV (centipoise) | 347 | 320 | 311 | 311 | 688 | 144 |
| SV/ML | 5.74 | 5.14 | 6.09 | 6.22 | 10.58 | 3.29 |
| $M_n$ | 82,951 | 80,653 | 88,850 | 87,998 | 101,524 | 75,075 |
| $M_w$ | 315,611 | 323,685 | 327,693 | 328,349 | 395,475 | 271,743 |
| $M_w/M_n$ | 3.80 | 4.01 | 3.69 | 3.73 | 3.90 | 3.62 |
| cis-1,4-linkage (%) | 96.6 | 96.6 | 96.7 | 96.8 | 97.2 | 96.1 |

Examples 5 to 7

The same procedures were conducted as described in Example 1, except that 0.294 mmol of EHA and various amount of 4-tert-butylcyclohexanol were used as listed in Table 2.

TABLE II

|  | Example No. | | | |
| --- | --- | --- | --- | --- |
|  | 5 | 6 | 3 | 7 |
| NiOct (mmol/hgm) | 0.030 | 0.030 | 0.030 | 0.030 |
| Al/Ni Molar ratio | 9.0 | 9.0 | 9.0 | 9.0 |
| Acid/Ni Molar ratio | 1.5 | 1.5 | 1.5 | 1.5 |
| Alcohol/Ni Molar ratio | 9.0 | 11.25 | 13.5 | 18.0 |
| F/Ni Molar ratio | 67.5 | 67.5 | 67.5 | 67.5 |
| Polymer yield (%) | 88 | 89 | 95 | 93 |
| Polymer Properties |  |  |  |  |
| Mooney viscosity ($ML_{1+4}$) @ 100° C. | 58.4 | 54.5 | 51.1 | 36.5 |
| SV (centipoise) | 507 | 352 | 311 | 147 |
| SV/ML | 8.68 | 6.46 | 6.09 | 4.03 |
| Mn | 93,596 | 90,542 | 88,850 | 75,132 |
| Mw | 365,075 | 335,260 | 327,693 | 267,494 |
| MWD | 3.90 | 3.70 | 3.69 | 3.56 |
| Polymer microstructure by IR |  |  |  |  |
| cis-1,4-linkage (%) | 97.0 | 96.7 | 96.7 | 96.4 |

Various modifications and alterations that do not depart from the scope and spirit of this invention will become apparent to those skilled in the art. This invention is not to be duly limited to the illustrative embodiments set forth herein.

What is claimed is:

1. A process for forming conjugated diene polymer, the process comprising the step of:
    polymerizing conjugated diene monomer in the presence of a catalytically effective amount of a catalyst composition formed by combining:
    (a) a nickel-containing compound selected from the group consisting of nickel carboxylates, nickel carboxylate borates, nickel organophosphates, nickel organophosphonates, nickel organophosphinates, nickel carbamates, nickel dithiocarbamates, nickel xanthates, nickel β-diketonates, nickel alkoxides or aryloxides, nickel halides, nickel pseudo-halides, nickel oxyhalides, and organonickel compounds;
    (b) an alkylating agent;
    (c) a fluorine-containing compound selected from the group consisting of elemental fluorine, halogen fluorides, hydrogen fluoride, organic fluorides, inorganic fluorides, metallic fluorides, organometallic fluorides, and mixtures thereof, where the fluorine-containing compound is complexed with an ether, alcohol, water, aldehyde, ketone, ester, nitrile, or combinations thereof;
    (d) a carboxylic acid; and
    (e) an alcohol, where said step of polymerizing takes place within a non-polar solvent, where the molar ratio of said alkylating agent to said nickel-containing compound (alkylating agent/Ni) is from about 1:1 to about 200:1, where the molar ratio of said fluorine-containing compound to said nickel-containing compound (F/Ni) is from about 7:1 to about 500:1, where the molar ratio of said carboxylic acid to said nickel-containing compound (COOH/Ni) is from about 0.1:1 to about 2:1, and where the molar ratio of said alcohol to said nickel-containing compound (OH/Ni) is from about 0.4:1 to about 80:1, and where said step of polymerizing employs from about 0.01 to about 0.1 mmole of nickel-containing compound per 100 g of conjugated diene monomer, where said step of combining includes pre-combining the nickel-containing compound, the alkylating agent, the carboxylic acid, and the alcohol to form a pre-combined mixture followed by the step of combining the fluorine-containing compound with the pre-combined mixture.

2. The process of claim 1, when the non-polar solvent is an aliphatic solvent, a cycloaliphatic solvent, or a mixture thereof.

3. The process of claim 2, where the molar ratio of said alkylating agent to said nickel-containing compound (alkylating agent/Ni) is from about 3:1 to about 30:1, where the molar ratio of said fluorine-containing compound to said nickel-containing compound (F/Ni) is from about 7.5:1 to about 450:1, where the molar ratio of said carboxylic acid to said nickel-containing compound (COOH/Ni) is from about 0.5:1 to about 1.5:1, and where the molar ratio of said alcohol to said nickel-containing compound (OH/Ni) is from about 0.5:1 to about 75:1.

4. The process of claim 1, where the alkylating agent is an organoaluminum compound.

5. The process of claim 4, where said organoaluminum compound includes those represented by the formula $AlR_nX_{3-n}$, where each R, which may be the same or different, is a mono-valent organic group that is attached to the aluminum atom via a carbon atom, where each X, which may be the same or different, is a hydrogen atom, a carboxylate group, an alkoxide group, or an aryloxide group, and where n is an integer of 1 to 3.

6. The process of claim 1, where the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

7. The process of claim 1, where the alcohol is defined by the formula R—OH, where R is a monovalent organic group.

8. The process of claim 7, where the alcohol is selected from the group consisting of aliphatic alcohols, cyclic alcohols, unsaturated alcohols, aromatic alcohols, heterocyclic alcohols, and polycyclic alcohols.

9. The process of claim 1, where the carboxylic acid is defined by the formula R—COOH, where R is a monovalent organic group.

10. The process of claim 9, where the carboxylic acid is selected from the group consisting of aliphatic carboxylic acids, saturated fatty acids, unsaturated fatty acids, aromatic acids, and cyclic acids.

11. The method of claim 1, where said step of polymerizing yields a polymer having a number average molecular weight of less than or equal to 90,542 g/mole.

12. The method of claim 11, where the polymer has a number average molecular weight of less than or equal to 88,850.

13. The method of claim 12, where the conjugated diene monomer is 1,3-butadiene and where the conjugated diene polymer is polybutadiene.

14. The method of claim 13, where said step of polymerizing converts the conjugated diene monomer to polymer at a yield of at least 89%.

15. The method of claim 14, where said step of polymerizing converts the conjugated diene monomer to polymer at a yield of at least 92%.

16. A process for forming polydienes, the process comprising:
    (i.) charging to a reactor, either together, partially together, or individually:
        (ia.) a nickel-containing compound;
        (ib.) an alkylating agent;
        (ic.) a carboxylic acid;
        (id.) an alcohol; and
        (ie.) optional conjugated diene monomer;
    (ii) charging to the reactor in a step separate than (i):
        (iia.) a fluorine-containing compound;
    (iii) charging together with step (i), together with step (ii), or separately:
        (iiia.) conjugated diene monomer; and
    (iv) allowing the conjugated diene monomer to polymerize, where the molar ratio of said alkylating agent to said nickel-containing compound (alkylating agent/Ni) is from about 1:1 to about 200:1, where the molar ratio of said fluorine-containing compound to said nickel-containing compound (F/Ni) is from about 7:1 to about 500:1, where the molar ratio of said carboxylic acid to said nickel-containing compound (COOH/Ni) is from about 0.1:1 to about 2:1, and where the molar ratio of said alcohol to said nickel-containing compound (OH/Ni) is from about 0.4:1 to about 80:1, and where said step of charging employs from about 0.01 to about 0.1 mmole of nickel-containing compound per 100 g of conjugated diene monomer.

17. The process of claim 1, where the molar ratio of said alcohol to said nickel-containing compound is from about 13.5:1 to about 18:1.

18. The process of claim 1, where the fluorine-containing compound is complexed with an ether.

* * * * *